B. L. LIGHT.
MARKER FOR PLANTERS.
APPLICATION FILED FEB. 28, 1921.

1,429,245.

Patented Sept. 19, 1922.
3 SHEETS—SHEET 1.

Inventor
B. L. LIGHT,
By Franklin H. Hough
Attorney

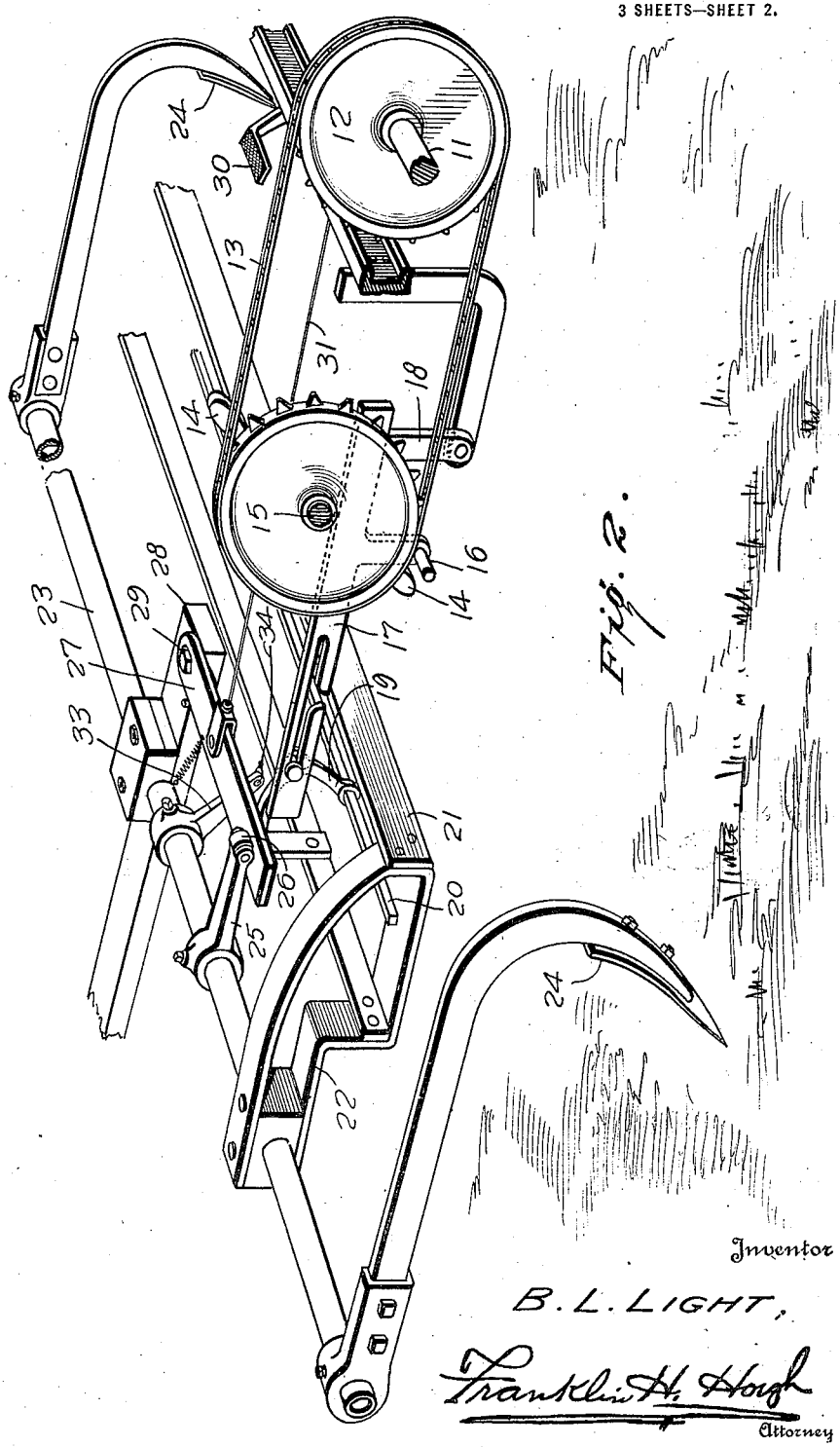

Patented Sept. 19, 1922.

1,429,245

UNITED STATES PATENT OFFICE.

BOLIVAR LEWIS LIGHT, OF ROGERS, ARKANSAS.

MARKER FOR PLANTERS.

Application filed February 28, 1921. Serial No. 448,502.

*To all whom it may concern:*

Be it known that I, BOLIVAR L. LIGHT, a citizen of the United States, residing at Rogers, in the county of Benton and State of Arkansas, have invented certain new and useful Improvements in Markers for Planters, of which the following is a specification, reference being had therein to the accompanying drawings.

This invention relates to markers for planters and has for an object to provide a marker adapted to be attached to and become a part of the planting implement, and providing means for marking the position of the first hill of grain planted in a row.

A further object of the invention is to provide in combination with a planter having means for depositing seed in rows and spaced hills in the row, of a device normally suspended upon the planter, out of operative position but adapted to be automatically dropped to the ground to form a mark thereon coinciding with the position of the first hill of seed deposited in the row.

With these and other objects in view the device comprises certain novel elements, units, parts and combinations as will be hereinafter more fully described and claimed.

In the drawings:

Figure 2 is a perspective view of the marker mechanism and a planter frame with the wheels and other parts removed;

Like characters of reference indicate corresponding parts throughout the several views.

Figure 1:
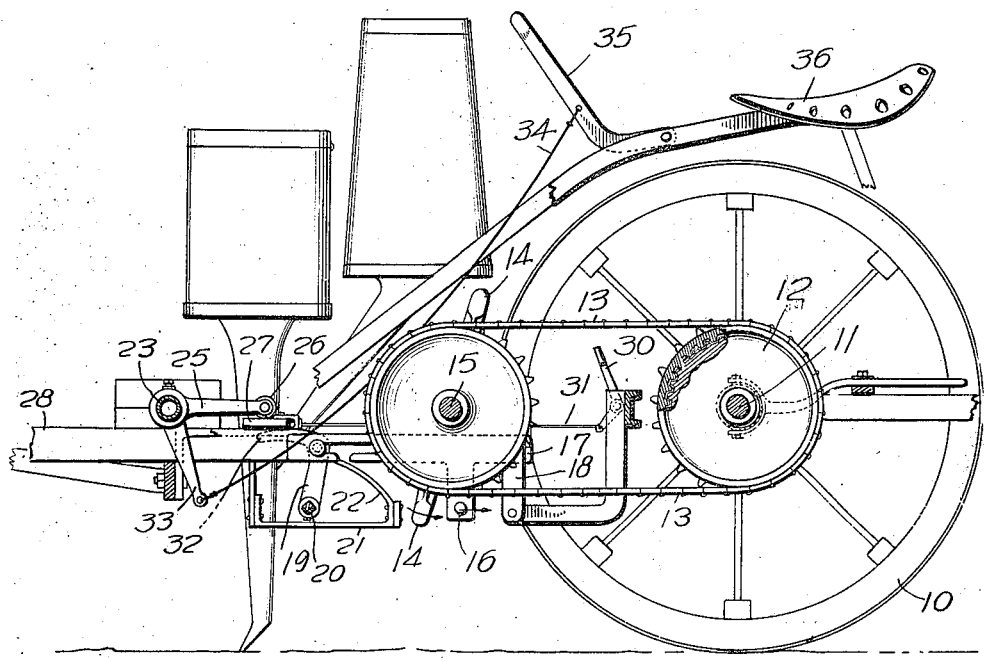
Figure 1 is a view partly in side elevation and partly in section showing the position and arrangement of the marker operating mechanism upon a planter.
Figure 4:
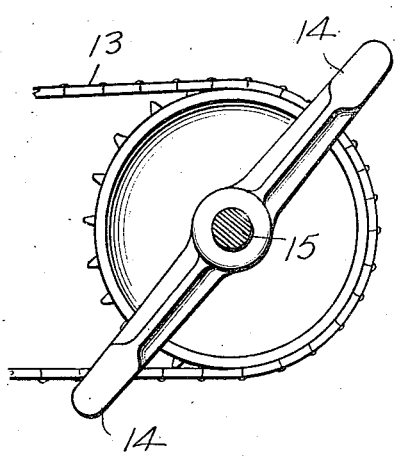
Figure 4 is a view in side elevation of the tappet which operates the check shaft.
Figure 3:
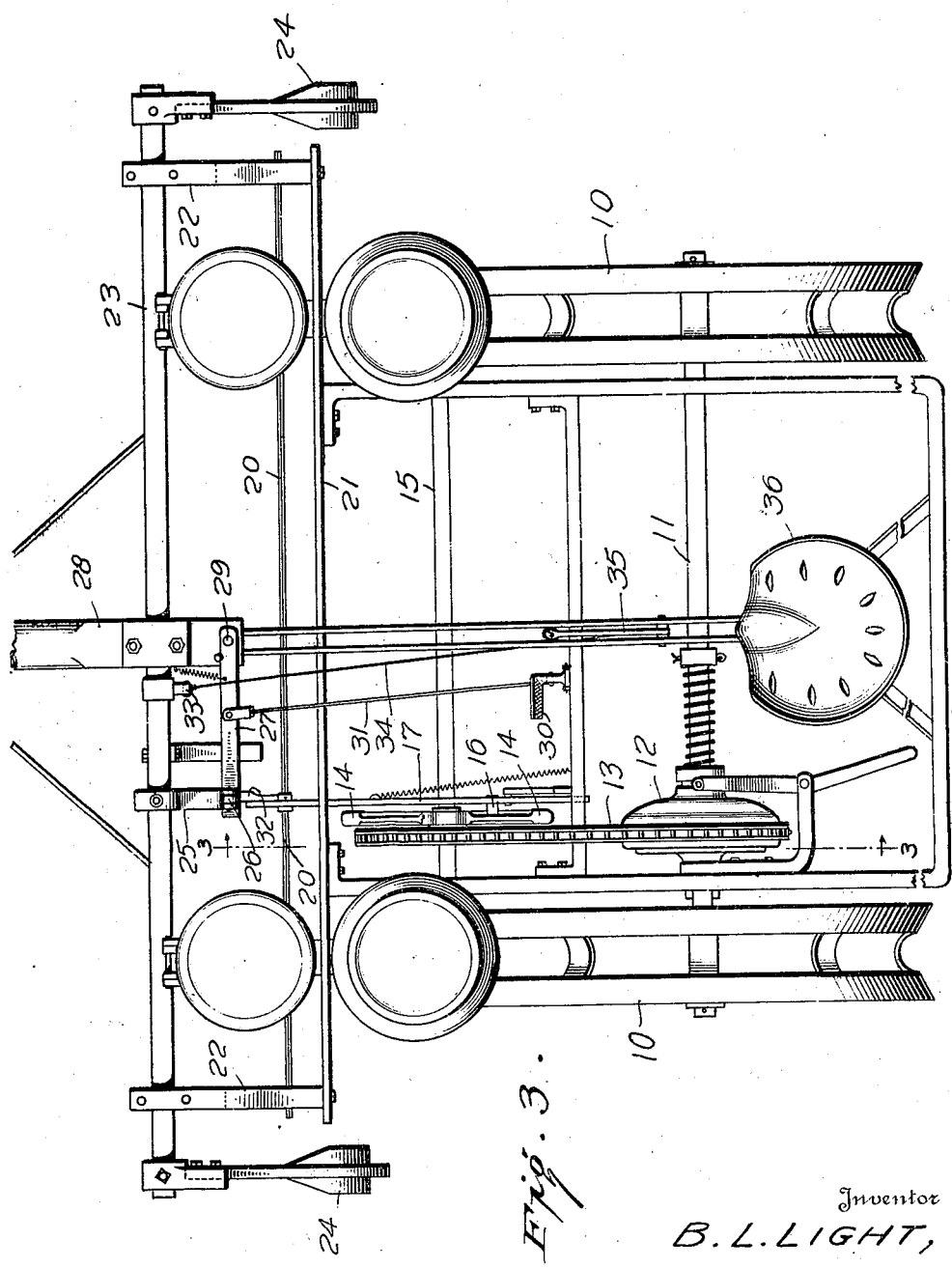
Figure 3 is a top plan view of a conventional planter with the marking mechanism applied thereto.

The improved marker mechanism which forms the subject matter of this application is adapted to be attached to planters of various types and constructions and is in no way limited to any particular construction, either that as shown in the drawings, or otherwise. As shown in the drawings purely for the purpose of illustration, a planter embodying supporting wheels 10 of the usual covering type, is mounted upon an axle 11 with a clutch mechanism 12 and sprocket chain 13 and operates a tappet 14 which is rigidly mounted upon the shaft 15 operating the accumulator. The tappet 14 is adapted, when rotating with the shaft 15, to engage a pin 16 carried by the bar 17, which is operated in any approved manner, as by being pivoted upon a link 18 at one end and a lever 19 at the opposite end, which latter lever is rigidly connected with the check shaft 20. No attempt has been made in the drawings to show the connection from the accumulator shaft 15 or the check shaft 20, the parts being immaterial to the present invention and of any usual, well-known, or standard type.

To the frame 21 are rigidly secured brackets 22 serving to journal the marker shaft 23. At its opposite ends and beyond the line of travel of the wheels 10, the shaft 23 is provided with blades or shovels 24, so proportioned and positioned relative to the organized structure that when they are in raised position, as shown at Figure 2, the shovels are out of engagement with the ground, but when they are dropped in the manner hereinafter described, they will engage the ground and produce marks thereon by forming indentations or furrows. The shovels 24 are normally supported out of engagement with the ground, while the planter is in normal operation, such supports being by means of an arm 25 rigidly secured to the shaft 23 and provided with a roller 26 supported upon an arm 27, pivoted to any convenient portion, as to the tongue 28 at the pivot 29. With the arm 27 in the position shown in the figures, the shovels 24 are supported out of engagement with the ground by the arm 25 bearing upon the arm 27. After an operation has been made and the operator is about to commence planting another row, the arm 27 is withdrawn from supporting the arm 25. This withdrawal is accomplished by means of a foot lever 30 in convenient position to be actuated by the operator and with a rod or cable 31 extending from such foot lever to the arm 27. When operating, the arm 27 is withdrawn by the actuation of the foot lever 30, and the arm 25 drops. As, however, it is necessary to attain the desired result that the shovels 24 drop in exact unison with the dropping of the first seed provision is made for still continuing the support of the shovels 24 after having been released from the arm 27. This support comprises an end 32 formed upon the lever 19 so that the arm 25 drops no further than to bring the roller 26 into engagement with such end 32, and is, therefore, still supported out of engagement with the ground. It will be noted that the lever 19 carrying the end 32 is a lever which actuates the check shaft 20 and that, therefore, when the mechanism is thrown into gear so that the device begins to plant, the first movement of the bar 17 to oscillate the check shaft will throw the end 32 out from beneath the arm 25 permitting the shovels 24 to drop in unison with the actuation of the check mechanism.

As the function of the device is only to drop the shovels in unison with the dropping of the first hill of grain, it is believed that the matter of dropping will be fully understood. It is necessary, however, to return the parts to normal to be in position to again perform their function. This is accomplished by securing an arm 33 to the shaft 23 with a rod or wire 34 extending therefrom to a manual lever 35, conveniently placed to the operator riding upon the seat 36. The actuation of the lever 35 tends to raise the shovels 24, the arm 27 being again moved beneath the arm 25 where it remains until dislodged by the actuation of the foot lever 30. The actuation of the lever 35, therefore, restores the parts to normal and in position to again perform their function when required.

What I claim to be new is:

1. The combination with a planter embodying a check shaft, of a marker carried by the planter, an arm carried by the planter adapted to hold the marker normally out of operative position, manual means for withdrawing the arm from supporting position, and means carried by the check shaft to detain the marker against dropping until the check shaft is actuated.

2. The combination with a planter embodying a check shaft, of an operating lever secured to the check shaft, a marker carried by the planter, an arm positioned to normally hold the marker out of operative position, manually actuated means for actuating the arm to drop the marker mechanism upon the check shaft lever, said parts being so arranged that the first actuation of the check shaft lever drops the marking mechanism.

3. The combination with a planter embodying a check shaft, of a marker shaft mounted transversely of the planter structure, marker points carried at the extremity of the structure, an operating lever reciprocating the check shaft, an arm carried by the marker shaft having means for at times engaging the operating lever, a manually-operable detent in the path of movement of said arm adapted to maintain said arm out of engagement with said lever, and means to withdraw said manual detent to permit the arm to drop into supporting engagement with said operating lever.

In testimony whereof I hereunto affix my signature in presence of two witnesses.

BOLIVAR LEWIS LIGHT.

Witnesses:
 BESS MCNEIL,
 L. E. PAGE.